F. J. NOILES.
PLOW ATTACHMENT.
APPLICATION FILED AUG. 19, 1916.
1,219,990.
Patented Mar. 20, 1917.
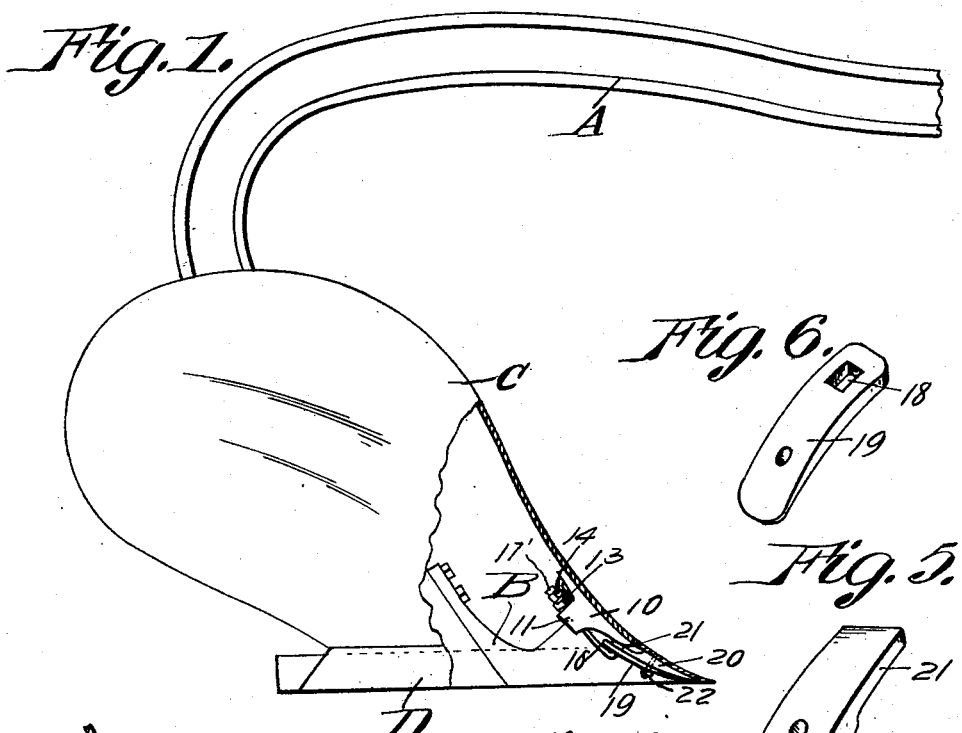
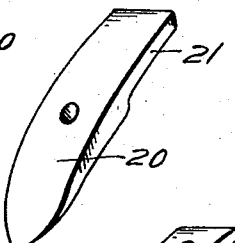
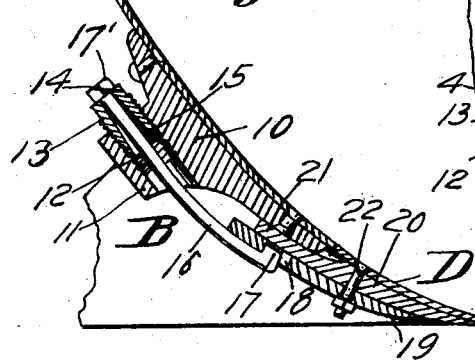
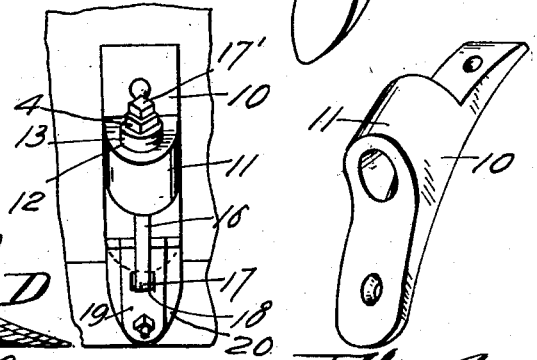
Inventor
F. J. Noiles,
By Falkert & Parker
Attorneys

UNITED STATES PATENT OFFICE.

FRANK J. NOILES, OF BEAVER, MANITOBA, CANADA.

PLOW ATTACHMENT.

1,219,990.  Specification of Letters Patent.  Patented Mar. 20, 1917.

Application filed August 19, 1916. Serial No. 115,883.

*To all whom it may concern:*

Be it known that I, FRANK J. NOILES, a subject of the King of Great Britain, residing at Beaver, in the Province of Manitoba and Dominion of Canada, have invented certain useful Improvements in Plow Attachments, of which the following is a specification, reference being had therein to the accompanying drawing.

The invention relates to a plow attachment, and more particularly to the class of share tighteners for plows.

The primary object of the invention is the provision of an attachment of this character wherein the share of the plow, should the same become loose on the frog, can be conveniently tightened without necessitating inverting the plow or turning it on one side or the other.

Another object of the invention is the provision of an attachment of this character wherein one part thereof is carried by the moldboard and has connection with the share of the plow so that the share may be tightened when the occasion requires, the attachment being of novel form to assure easy adjustment of the tightener of the share.

A further object of the invention is the provision of an attachment of this character which is simple in construction, strong, durable and inexpensive in manufacture and installation.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a side elevation of a plow partly in section, showing the attachment constructed in accordance with the invention applied;

Fig. 2 is an enlarged vertical sectional view taken through a portion of the plow and through the attachment;

Fig. 3 is a fragmentary inner plan view showing the attachment applied to the moldboard and share;

Fig. 4 is a detail perspective view of the hanger of the attachment;

Fig. 5 is a detail perspective view of the cleat of the attachment; and

Fig. 6 is a detail perspective view of the connecting plate of the attachment for the share of the plow.

Similar reference characters indicate similar parts throughout the several views of the drawing.

Referring to the drawing in detail, A designates a portion of the beam; B, the frog connected thereto in any ordinary well known manner; C, the moldboard and D the share of a landside plow, which is of the ordinary well known construction. The share D is carried by the frog B as usual, and connected with the moldboard C and said share is the attachment hereinafter fully described.

The attachment comprises a supporting member which is in the form of a casting having a base 10 and a lug 11, the base 10 being riveted, bolted or otherwise fastened to the inner face of the moldboard C at a point above the joint between the same and the share D of said plow, and the lug 11 is formed with an internally threaded bore 12 in which is adjustably engaged an externally threaded plug 13 provided at its upper end with a wrench-engaging head 14 so that the said plug can be adjusted within the lug 11, as will be obvious.

The plug 13 is formed with an upwardly tapered central bore 15, through which is loosely passed the shank 16 of a hook member, the shank being slightly curved and formed at its upper end with a head 17′, which has its bearing against the head 14 of the plug 13, while the bill 17 of said hook member is loosely engaged in an aperture 18 formed in a connecting plate 19 near one end thereof. This plate is engaged against a cleat 20 which is disposed against the inner face of the share D at the toe or tip thereof and is formed with a reduced end 21 which overlaps the base 10 of the supporting member carried by the moldboard, the plate 19 and cleat 20 being fastened to the share D through the medium of a bolt 22 or other like fastener, as is clearly shown in Figs. 1, 2 and 3 of the drawing.

The bill 17 of the hook member can be readily detached from within the aperture 18 should it be desired to remove the share D from the frog B of the plow.

In the use of the attachment, the share

D, when the same becomes loose due to severe usage of the plow or excessive pressure of the earth upon the same when said plow is advanced in hard soil, the plug 13 can be turned in the lug 12 so that the hook member will be acted upon in a direction to move the share D into close contacting relation with the moldboard C of the plow. It will be apparent that the hook member has its shank swiveled or loosely engaged in the plug 13 which can be readily turned by the application of a wrench or other like tool to the head 14 thereof. Likewise, by the provision of the plug the shank may be easily adjusted, since rust will not accumulate on the plug as easily as on a nut, if such was employed for adjusting the shank. Furthermore there is less danger of the shank becoming distorted when the plug is used in the manner stated.

It is of course to be understood that changes, variations and modifications may be made in the invention such as come properly within the scope of the appended claims without departing from the spirit of the invention or sacrificing any of its advantages.

From the foregoing it is believed that the application and manner of use of the attachment will be clearly understood and, therefore, a more extended explanation has been omitted.

Having thus described my invention, I claim:—

1. The combination with a moldboard and share of a plow, of a tightening device comprising two members connected respectively to the moldboard and the share, a lug on one of the members, a plug adjustably threaded in the lug, and a rod loosely carried in the plug and having loose detachable connection with the other member.

2. An attachment of the character described comprising a supporting member adapted to be fixed to the moldboard of a plow and having a lug, a plug adjustably threaded in the lug, a connecting plate adapted for connection with the share of said plow and having an aperture, and a hook member loosely carried in the plug and having its bill portion detachably engaged in the aperture in the connecting plate.

In testimony whereof I affix my signature.

FRANK J. NOILES.

Copies of this patent may be obtained for five cents each, by addressing the "Commissioner of Patents, Washington, D. C."